United States Patent

Hattori et al.

[11] Patent Number: 4,481,424
[45] Date of Patent: Nov. 6, 1984

[54] DRIVING MECHANISM FOR VEHICLE ENGINE AND ACCESSORY

[75] Inventors: Yoshiyuki Hattori, Toyoake; Kazuma Matsui, Toyohashi, both of Japan

[73] Assignee: Nippondenso Co., Ltd., Kariya, Japan

[21] Appl. No.: 375,223

[22] Filed: May 5, 1982

[30] Foreign Application Priority Data

May 7, 1981 [JP] Japan .................................. 56/68952

[51] Int. Cl.³ ..................... H02K 19/36; F02N 11/00; F02N 17/00
[52] U.S. Cl. ............................. 290/38 R; 290/38 C; 290/40 R; 180/54.1; 123/179 J
[58] Field of Search ................. 290/38, 38 R, 38 C, 290/45, 8, 37 A, 37 R, 33, 36 R; 180/54 R, 286, 287; 123/179 J, 179 B, 179 G; 361/183

[56] References Cited

U.S. PATENT DOCUMENTS

| Re. 30,686 | 7/1981 | Bucher | 290/38 C X |
|---|---|---|---|
| 3,300,619 | 1/1967 | Nilssen | 290/38 R |
| 3,325,650 | 6/1967 | Barnes | 290/40 R |
| 3,435,325 | 3/1969 | Laudel, Jr. | 290/40 R X |
| 3,478,730 | 11/1969 | Bucher | 290/38 R |
| 3,685,606 | 8/1972 | Blow, Jr. | 290/38 C X |
| 3,793,529 | 2/1974 | Bucher | 290/33 |
| 3,862,429 | 1/1975 | Bucher | 290/38 X |
| 4,080,537 | 3/1978 | Bucher | 290/38 C X |
| 4,139,780 | 2/1979 | Hucker et al. | 290/8 X |
| 4,305,254 | 12/1981 | Kawakatsu et al. | 290/45 X |
| 4,366,385 | 12/1982 | Williams | 290/38 R |
| 4,389,692 | 6/1983 | Sander et al. | 290/38 R X |
| 4,402,286 | 9/1983 | Pagel et al. | 290/38 R X |
| 4,418,289 | 11/1983 | Mortensen | 290/38 R X |
| 4,426,585 | 1/1984 | Bigalke | 290/38 R X |

Primary Examiner—J. V. Truhe
Assistant Examiner—Terry Flower
Attorney, Agent, or Firm—Cushman, Darby & Cushman

[57] ABSTRACT

A driving mechanism comprises an electric motor assembly having an output shaft drivingly connected to a vehicle accessory device and arranged to be connected to an internal combustion engine, the motor assembly being designed to generate a high output torque on the output shaft in its first activated condition and to generate a low output torque on the output shaft in its second activated condition, an electrically operated actuator for connecting the output shaft to the engine upon energization thereof and disconnecting the output shaft from the engine upon deenergization thereof, and an electric control circuit for energizing the actuator and the motor assembly to start the engine under the first activated condition of the motor assembly, for deenergizing the actuator after start of the engine, for switching over the motor assembly to its second activated condition from its first activated condition when the accessory device is unloaded and for switching over the motor assembly to its first activated condition from its second activated condition when the accessory device is loaded.

9 Claims, 6 Drawing Figures

DRIVING MECHANISM FOR VEHICLE ENGINE AND ACCESSORY

BACKGROUND OF THE INVENTION

The present invention relates to a driving mechanism adapted to drive vehicle accessory devices such as a hydraulic pump for a power steering device, an air pump, a vacuum pump or the like, and more particularly to a driving mechanism for starting an internal combustion engine and driving the vehicle accessory devices under the control of an electric current applied thereto from an electric power source.

In the case that such vehicle accessory devices as described above are driven in a usual manner by a prime mover of the vehicle, rotational speed of the accessory devices excessively increases in operation of the prime mover at a high speed, resulting in output torque losses of the prime mover. In the case that the accessory devices are driven by an electric motor, a high output torque is temporarily required only when the accessory devices are loaded in operation thereof, resulting in necessity of an electric motor of a large capacity.

SUMMARY OF THE INVENTION

It is, therefore, a primary object of the present invention to provide a driving mechanism which is capable of generating a high output torque therefrom for a short period of time to start an internal combustion engine and to drive vehicle accessory devices when loaded in operation thereof and capable of generating a low output torque therefrom to continuously drive the vehicle accessory devices under unloaded condition thereof.

According to the present invention briefly summarized, the primary object is accomplished by provision of a driving mechanism which comprises an electric motor assembly having an output shaft drivingly connected to vehicle accessory devices and arranged to be connected to an internal combustion engine, the motor assembly being designed to be selectively connected to an electric power source for generating a high output torque on the output shaft in its first activated condition and for generating a low output torque on the output shaft in its second activated condition, an electrically operated actuator for connecting the output shaft to the engine upon energization thereof and for disconnecting the output shaft from the engine upon deenergization thereof, and an electric control circuit including first means for connecting the actuator and the motor assembly to the electric power source to start the engine under the first activated condition of the motor assembly and for disconnecting the actuator from the power source after start of the engine, and second means for switching over the motor assembly to its second activated condition from its first activated condition when the accessory devices are unloaded and for switching over the motor assembly to its first activated condition from its second activated condition when the accessory devices are loaded at a value larger than a predetermined value.

In the actual practices of the present invention, it is preferable that the motor assembly is in the form of a starter motor assembly of the armature type of double-layer winding whose first winding is designed to generate a high output torque on the output shaft upon energization thereof and whose second winding is designed to generate a low output torque on the output shaft upon energization thereof.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
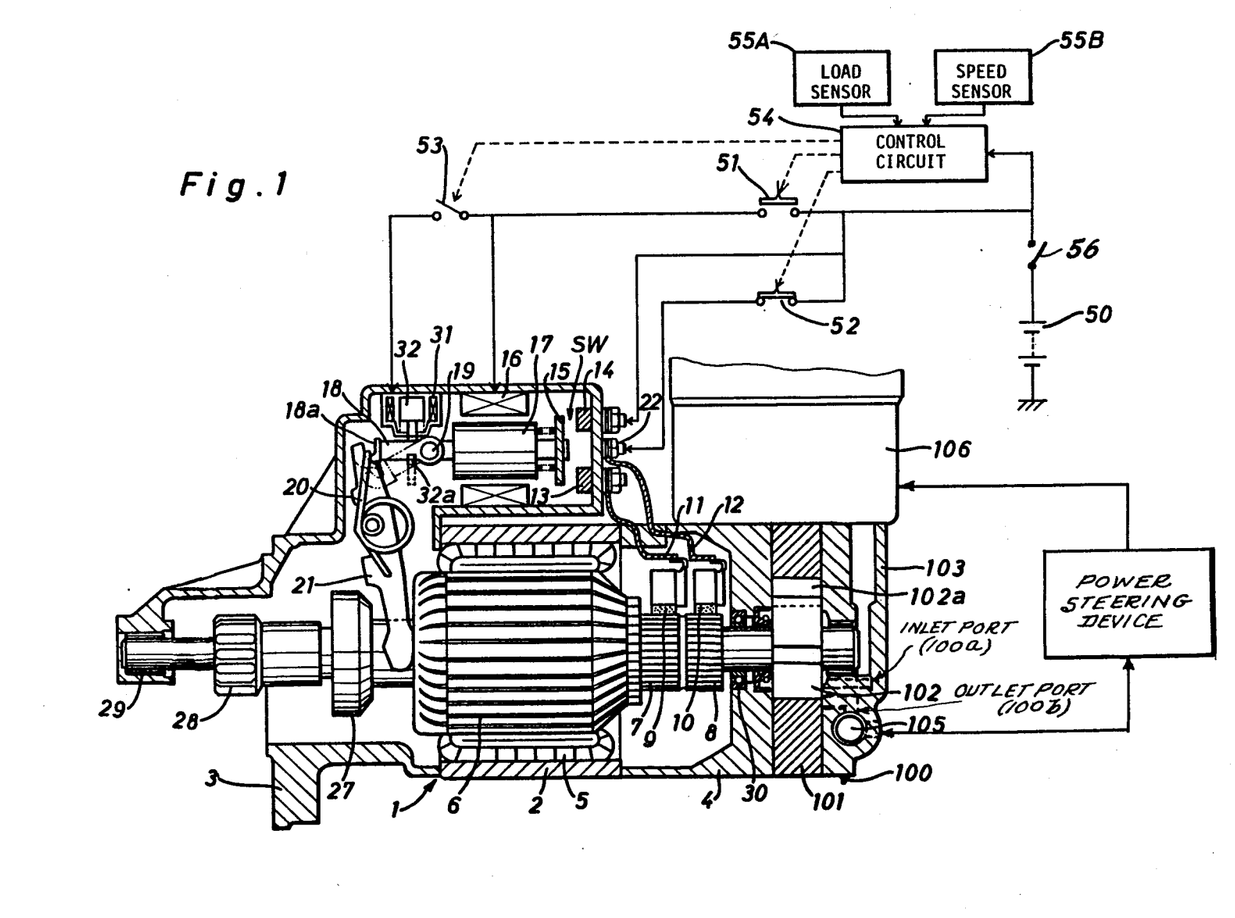
FIG. 1 is an elevational view partly in section of the driving mechanism in accordance with the present invention.

As illustrated in FIG. 1 of the drawings, the driving mechanism includes an electric motor assembly in the form of a starter motor assembly 1 of the armature type of double-layer winding for starting an internal combustion engine (not shown) and for driving a hydraulic pump for a power steering device of an automotive vehicle. The starter motor assembly 1 includes a cylindrical yoke member 2 secured at its opposite ends to a housing 3 and to an end housing 4, a field winding 5 assembled within yoke member 2, and an armature 6 of double-layer winding surrounded by field winding 5. The first winding of armature 6 is provided with a commutator 7 which is coupled with a first brush 9 to be supplied with an electric current from an electric power source in the form of a vehicle battery 50 to generate a high output torque on the output shaft of motor assembly 1. The second winding of armature 6 is provided with a commutator 8 which is coupled with a second brush 10 to be supplied with the electric current to generate a low output torque on the output shaft of motor assembly 1. The first brush 9 is connected to an electrode terminal 13 through a leading wire 11, and the second brush 10 is connected to an electrode terminal 22 through a leading wire 12.

The electrode terminal 13 is associated with an electrode terminal 14 in connection with the electric power source 50. The electrode terminals 13 and 14 are arranged to cooperate with an electrode disk 15 to provide a solenoid switch SW. Each of electrode terminals 13, 14 and 22 is bolted to the side wall of an upper compartment of housing 3 through an insulating material, and the electrode disk 15 is mounted on one end of a first movable spool 17 which is surrounded by a first solenoid winding 16 secured to the upper wall of housing 3. A swingable arm 18 is pivoted at 19 to the other end of spool 17 and is integrally formed at its free end with a hook 18a which is arranged to be brought into engagement with a torsion spring 20 for a driving lever 21. A second solenoid winding 31 is secured to the upper wall of housing 3 and arranged in surrounding relationship with a second movable spool 32 which is integrally provided at its lower end with a hook 32a for receiving the swingable arm 18 thereon.

The driving lever 21 is rotatably supported from the side wall of housing 3 and arranged in a usual manner to move an over-running clutch 27 toward a pinion 28 in its clockwise rotation so as to start the internal combustion engine. The torsion spring 20 is assembled with the driving lever 21 in such a manner that the driving lever 21 is normally biased counterclockwise and rotates clockwisely when the torsion spring 20 is pulled by engagement with the hook 18a of arm 18 in the rightward direction. The pinion 28 is slidably mounted on the output shaft of the motor assembly 1 to be driven by the armature 6 upon engagement with the over-running clutch 27. The output shaft of the motor assembly is rotatably supported by a pair of bearings 29 and 30 in the respective housings 3 and 4.

The hydraulic pump assembly is designated with the reference numeral 100 which includes a pump housing 103 secured in a fluid-tight manner to the end housing 4 through a stator housing 101 to define a pump cavity within the stator housing 101, a rotor 102 eccentrically disposed within the pump cavity and fixed to the output shaft of the motor assembly 1, and a plurality of axially extending vanes 102a slidably fitted in slots in the body of the rotor 102. A fluid reservoir 106 is mounted on the pump housing 103 for connection to an inlet port 100a of the pump cavity, and a flow control valve 105 is assembled within the pump housing 103 to control the flow quantity of fluid discharged from an outlet port 100b of the pump cavity to the power steering device.

The first solenoid winding 16 is connected to the electric power source 50 by way of a first control switch 51, the second solenoid winding 31 is connected to the electric power source 50 by way of a lever switch 53 and the first control switch 51, and the electrode terminal 22 is connected to the electric power source 50 by way of a second control switch 52. The three switches 51, 52 and 53 are under the control of an electric control circuit 54 which is connected to a load sensor 55A and a rotational speed sensor 55B. The load sensor 55A is arranged to detect a load acting on the power steering device in its operation, and the rotational speed sensor 55B is arranged to detect rotational speed of the engine. The electric control circuit 54 includes a comparator for comparing an output signal indicative of the detected load from load sensor 55A with a predetermined value and for comparing an output signal indicative of the detected rotational speed from sensor 55B with a predetermined value.

Figure 2:
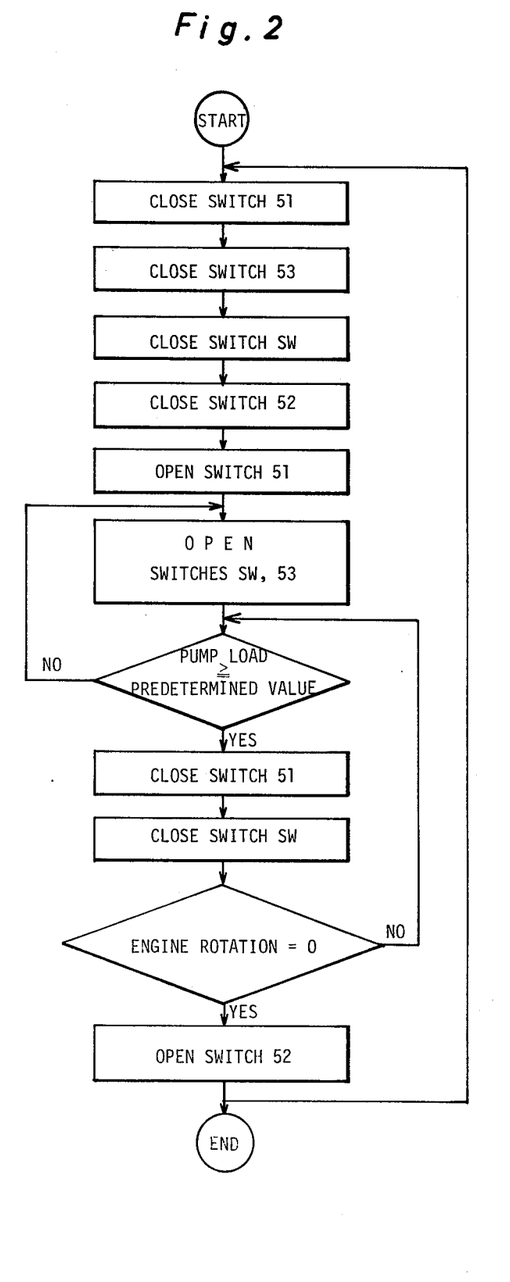
FIG. 2 is a flow diagram illustrating operation of the driving mechanism.

Hereinafter, the operation of the driving mechanism will be described with reference to FIGS. 1 and 2. When a conventional ignition switch 56 is operated to its start position, the electric control circuit 54 produces an output signal for closing all the switches 51, 52, 53 in response to operation of the ignition switch. This results in energization of the solenoid windings 16 and 31 to cause rightward movement of the first spool 17 and upward movement of the second spool 32. In this embodiment, the first solenoid winding 16 is designed to cause the rightward movement of spool 17 slightly after the upward movement of spool 32. Thus, the arm 18 is pulled up by the hook 32a of spool 32 and brought into engagement with the torsion spring 20, as shown in FIG. 1. Subsequently, the electrode disk 15 is brought into engagement with the electrode terminals 13 and 14 in response to the rightward movement of spool 17 to close the solenoid switch SW so as to supply the electric current from the power source to the commutator 7 of the first winding of armature 6 by way of the first brush 9. At the same time, the commutator 8 of the second winding of armature 6 is supplied with the electric current by way of the second control switch 52 and the second brush 10, while the driving lever 21 rotates clockwisely in response to the rightward movement of spool 17 to engage the over-running clutch 27 with the pinion 28. Consequently, the armature 6 acts as a starter to generate a high output torque on the output shaft of motor assembly 1 to start the engine.

When the start of the engine is detected by the rotational sensor 55B, the electric control circuit 54 acts to produce an output signal for opening the first control switch 51 and the lever switch 53 in response to an output signal from sensor 55B. As a result of opening the switches 51 and 53, the first solenoid winding 16 is deenergized to allow leftward movement of spool 17, and the second solenoid winding 31 is deenergized to allow downward movement of spool 32. In this instance, the spool 32 is supported in place by engagement with a bottom portion of the housing for solenoid winding 31, and the arm 18 moves down by its gravity to disengage the torsion spring 20 from its hook 18a so as to allow the counterclockwise rotation of the driving level 21. Thus, the supply of electric current to the first winding of armature 6 is interrupted, while the second control switch 52 is maintained in its closed position to hold the electric current supply to the second winding of armature 6. Under such condition, the hydraulic pump assembly 100 is driven by a low output torque of armature 6 when a load acting on the power steering device is at a low level (approximately 3 kg/cm$^2$) during the straight travel of the vehicle.

When the power steering device is operated to increase the load acting on the hydraulic pump assembly 100 larger than a predetermined value, the comparator of electric control circuit 54 discriminates an output signal indicative of the increase of load from load sensor 55A to produce an output signal for closing the first control switch 51. This results in energization of the first solenoid winding 16 to effect the rightward movement of spool 17. Upon the rightward movement of spool 17, the solenoid switch SW is closed to supply the electric current to the commutator 7 of the first winding of armature 6 by way of the first brush 9. On the other hand, the lever switch 53 is maintained in its open position so that the driving lever 21 may not be rotated clockwisely due to disengagement of the arm 18 from the torsion spring 20, as shown by imaginary lines in FIG. 1. Thus, the armature 6 acts to generate a high output torque on the output shaft of motor assembly 1 for driving the pump assembly 100 under its maximum load (approximately 70 kg/cm$^2$) in steering operation of the vehicle. When the engine is arrested, the comparator of electric control circuit 54 discriminates zero value of an output signal from speed sensor 55B to produce an output signal for opening the second control switch 52. This results in interruption of the supply of electric current to the second winding of armature 6 to arrest the motor assembly 1.

Figure 3:
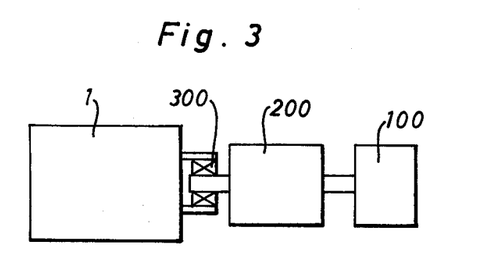
FIG. 3 illustrates an arrangement of a modification of the driving mechanism of FIG. 1.

In FIG. 3, there is illustrated a modification of the driving mechanism in which an auxiliary motor assembly 200 is drivingly connected to the starter motor assembly 1 by way of a one-way clutch 300 to drive the hydraulic pump assembly 100. The auxiliary motor assembly 200 is designed to generate a low output torque in its energized condition. In operation of the starter motor assembly 1, the auxiliary motor assembly 200 may not be supplied with the electric current from the electric power source to act as a coupling between the starter motor assembly 1 and the pump assembly 100. When the rotational speed of the starter motor assembly 1 is higher than that of the auxiliary motor assembly 200, the one-way clutch 300 engages to transmit the output torque of motor assembly 1 to the pump assembly 100. Conversely, the one-way clutch 300 disengages when the rotational speed of the auxiliary motor assembly 200 is higher than that of the starter motor assembly 1.

Figure 4:
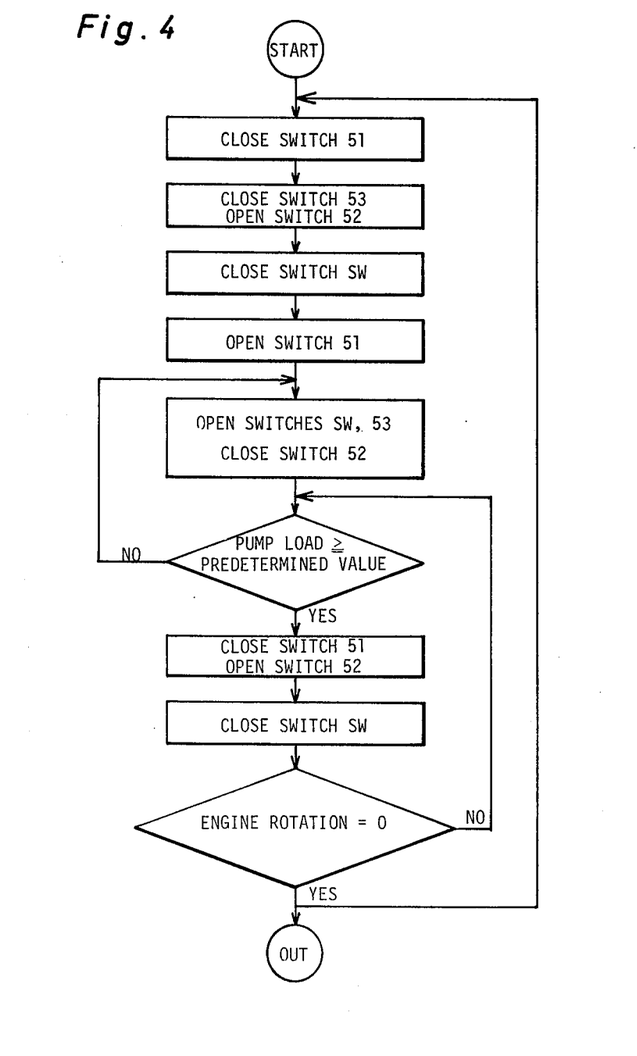
FIG. 4 is a flow diagram illustrating operation of the modification.

In such arrangement as described above, the auxiliary motor assembly 200 is arranged to be supplied with the electric current from the electric power source 50 when the load acting on the pump assembly 100 is smaller than the predetermined value. On the other hand, the starter motor assembly 1 is arranged in such a manner that the supply of electric current to the second winding of armature 6 is interrupted in operation of the auxiliary motor assembly 200. Thus, the pump assembly 100 is driven by the auxiliary motor assembly 200 after start of the engine, and the one-way clutch 300 is maintained in its disengaged position during operation of the auxiliary motor assembly 200. When the power steering device is operated to increase the load acting on the pump assembly 100, the starter motor assembly 1 is supplied with the electric current from the power source to generate a high output torque on the output shaft of armature 6, and the supply of electric current to the auxiliary motor assembly 200 is interrupted.

Figure 5:
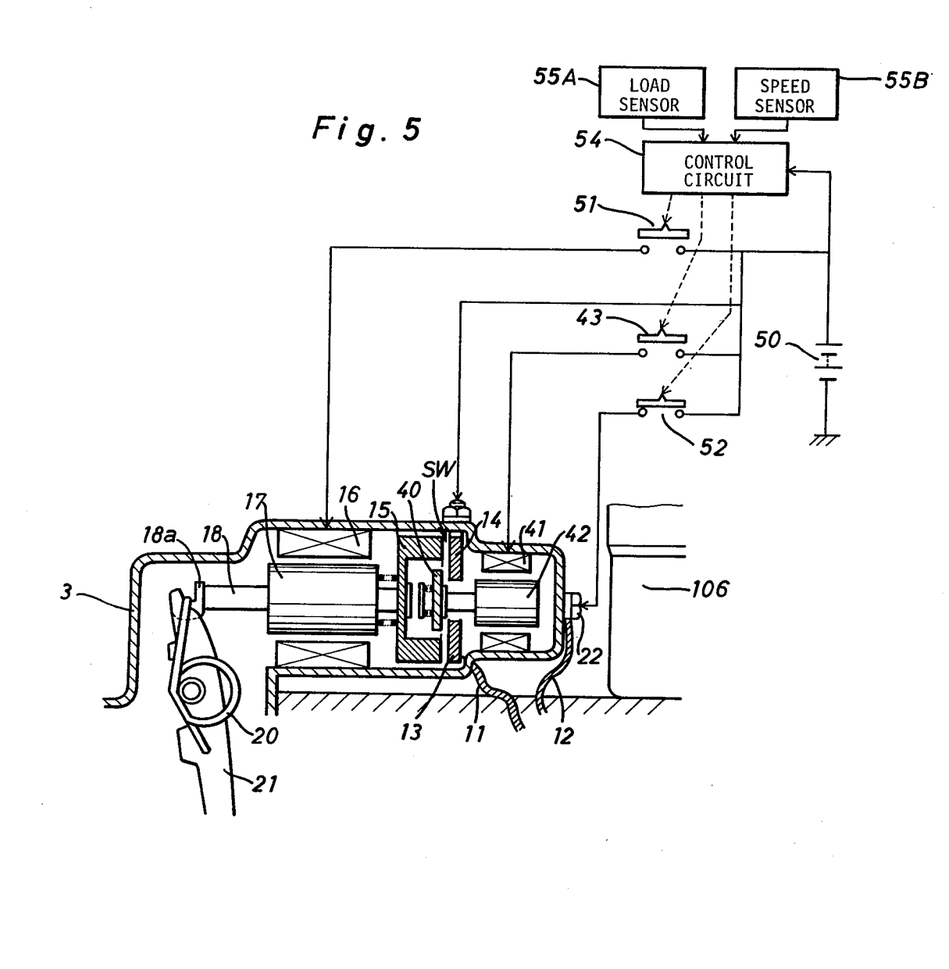
FIG. 5 is an elevational view partly in section of another modification of the driving mechanism of FIG. 1.

In FIG. 5, there is illustrated another modification of the driving mechanism in which the arm 18 is integral with the first spool 17, and the solenoid winding assembly 31, 32 is replaced with a solenoid switch assembly including a solenoid winding 41 and a movable spool 42. The electrode disk 15 on spool 17 is modified in the form of a cup-shaped electrode member in which an electrode disk 40 is located and mounted on one end of spool 42 to be brought into engagement with the electrode terminals 13 and 14. The solenoid winding 41 is secured to the inner peripheral wall of an extended portion of housing 3 and is arranged to be energized under the control of a control switch 43.

Figure 6:
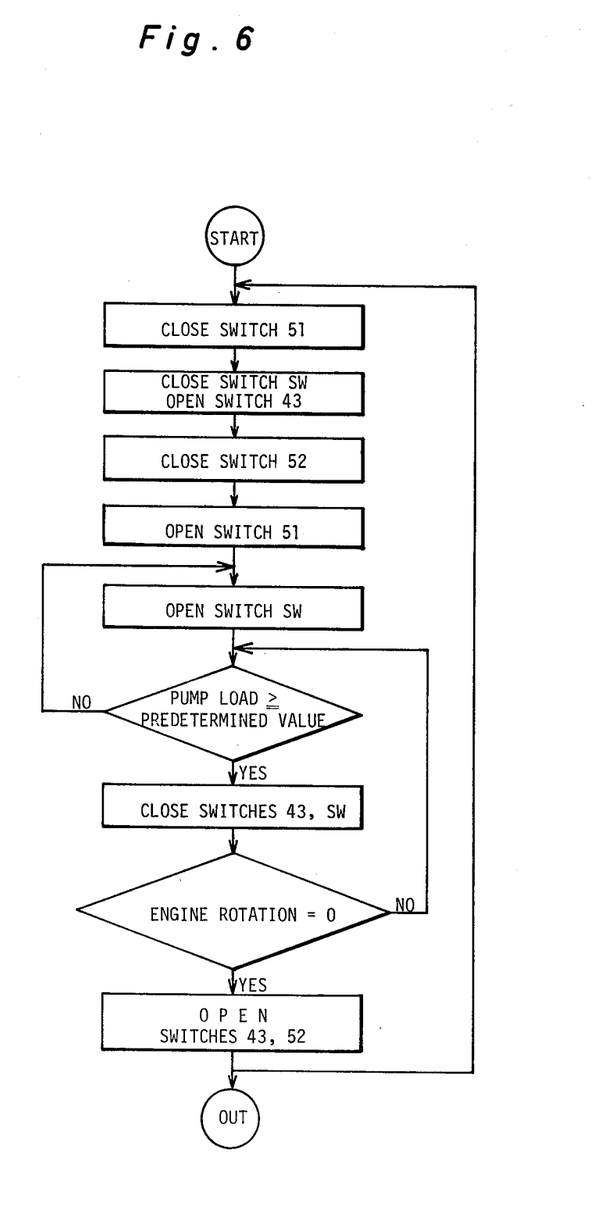
FIG. 6 is a flow diagram illustrating operation of the modification of FIG. 5.

In such arrangement as described above, when the ignition switch 56 is operated to its start position, the electric control circuit 54 acts to produce an output signal for closing the first and second control switches 51 and 52 in response to operation of the ignition switch. This results in energization of the solenoid winding 16 to cause rightward movement of spool 17. Then, the arm 18 acts to rotate the driving lever 21 clockwisely, while the electrode disk 15 is brought into engagement with the electrode terminals 13 and 14 to connect the electric power source 50 to the commutator 7 of the first winding of armature 6 by way of the first brush 9. Simultaneously, the commutator 8 of the second winding of armature 6 is connected to the electric power source 50 by way of the control switch 52 and the second brush 10. As a result of energization of both the windings of armature 6, the engine is started by a high output torque of the armature 6. After start of the engine, the control switch 51 opens under the control of the electric control circuit 54 to deenergize the solenoid winding 16, resulting in leftward movement of spool 17. Thus, the counterclockwise rotation of the driving lever 21 is permitted, and the supply of electric current to the first winding of armature 6 is interrupted, while the control switch 52 is maintained in its closed position to hold the supply of electric current to the second winding of armature 6. Under such condition, the hydraulic pump assembly 100 is driven by a low output torque of the armature 6, as described above.

When the load acting on the pump assembly 100 increases in response to operation of the power steering device, the comparator of eleccrtic control circuit 54 discriminates an output signal indicative of the increase of load from load sensor 55A to produce an output signal for closing the control switch 43. This results in energization of the solenoid winding 41 to cause rightward movement of spool 42. In response to the rightward movement of spool 42, the electrode disk 40 is brought into engagement with the terminals 13 and 14 to supply the electric current to the commutator 7 of the first winding of armature 6 by way of the first brush 9. Thus, the armature 6 of motor assembly 1 acts to generate high output torque on the output shaft for driving the pump assembly 100 under its maximum loaded condition.

In the actual practices of the present invention, a control circuit such as a chopper circuit may be adapted to the starter motor assembly 1 to control the electric power supply to the motor assembly 1 in accordance with load acting on accessory devices for selectively generating a low or high output torque on the output shaft of the motor assembly. It is also noted that the driving mechanism of the present invention may be adapted to drive various accessory devices such as other hydraulic pump, an oil pump, an air pump, a vacuum pump or the like.

Having now fully set forth structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A driving mechanism for starting an internal combustion engine and driving an electrically driven accessory device such as a hydraulic pump, a pneumatic pump or the like under the control of an electric power applied thereto, comprising:

a starter motor assembly having an output shaft drivingly connected to said accessory device and arranged to be connected to said engine, said motor assembly being in the form of an armature type of double-layer winding whose first winding is designed to generate a high output torque on said output shaft upon energization thereof and whose second winding is designed to generate a low output torque on said output shaft upon energization thereof;

electrically operated actuator means for connecting said output shaft to said engine upon energization thereof and for disconnecting said output shaft from said engine upon deenergization thereof; and an electric control apparatus for energizing the first winding of said armature and said actuator means to effect starting of said engine and for deenergizing them after starting of said engine, said control apparatus being further arranged for energizing the second winding of said armature when said accessory device is in its unloaded condition and for energizing the first winding of said armature when said accessory device is in its loaded condition.

2. A driving mechanism as claimed in claim 1, further comprising an auxiliary motor assembly cooperable with said starter motor assembly to drive said accessory device, said auxiliary motor assembly being designed to generate a low output torque in its energized condition and to act as a coupling between said starter motor assembly and said accessory device in its deenergized condition, and wherein said electric control apparatus is arranged to energize said auxiliary motor assembly and deenergize the second winding of said armature when said accessory device is in its unloaded condition and to energize the first winding of said armature and deenergize said auxiliary motor assembly when said accessory device is in its loaded condition.

3. A driving mechanism as claimed in claim 1, wherein said electric control apparatus comprises first means for producing a first output signal in response to application of electric power to said control apparatus, second means for detecting operation of said engine to produce a second output signal indicative of starting of said engine, third means for detecting a load acting on said accessory device to produce a third output signal therefrom when said accessory device is unloaded and to produce a fourth output signal therefrom when said accessory device is loaded, and an electric control circuit responsive to the first output signal from said first means to energize the first winding of said armature and said actuator means and responsive to the second output signal from said second means to deenergize the first winding of said armature and said actuator means, said electric control circuit being further responsive to the third output signal from said third means to energize the second winding of said armature and responsive to the fourth output signal from said third means to energize the first winding of said armature.

4. A driving mechanism as claimed in claim 3, wherein said first means is an ignition switch for connecting an electric power source to said electric control apparatus in its operation to produce an output signal for starting said engine, said second means is a speed sensor for detecting rotational speed of said engine to produce an output signal indicative of the detected rotational speed of said engine, and said third means is a load sensor for detecting a load acting on said accessory device to produce an output signal indicative of the unloaded condition of said accessory device and to produce an output signal indicative of the loaded condition of said accessory device.

5. A driving mechanism as claimed in claim 4, wherein said actuator means comprises an over-running clutch mounted on said output shaft of said starter motor assembly for connecting said output shaft to said engine upon energization thereof, and an electric actuator operatively connected to said over-running clutch and arranged to be energized in response to the output signal from said ignition switch for effecting engagement of said over-running clutch and to be deenergized in response to the output signal from said speed sensor for effecting disengagement of said over-running clutch, said actuator being further arranged to be energized in response to the output signal indicative of the loaded condition of said accessory device and to be deenergized in response to the output signal indicative of the unloaded condition of said accessory device, and wherein said electric control circuit comprises first switch means cooperable with said actuator for connecting said power source to the first winding of said armature in response to energization of said actuator and for disconnecting the first winding of said armature from said power source in response to deenergization of said actuator, and second switch means for connecting said power source to the second winding of said armature in response to the output signal indicative of the unloaded condition of said accessory device from said load sensor.

6. A driving mechanism as claimed in claim 4, wherein said actuator means comprises an over-running clutch mounted on said output shaft of said starter motor assembly for connecting said output shaft to said engine upon energization thereof, and a first electric actuator operatively connected to said over-running clutch and arranged to be energized in response to the output signal from said ignition switch for effecting engagement of said over-running clutch and to be deenergized in response to the output signal from said speed sensor for effecting disengagement of said over-running clutch, and wherein said electric control circuit comprises a second electric actuator arranged to be energized in response to the output signal indicative of the loaded condition of said accessory device and to be deenergized in response to the output signal indicative of the unloaded condition of said accessory device, first switch means cooperable with said first and second electric actuators for connecting said power source to the first winding of said armature in response to energization of one of said actuators and for disconnecting the first winding of said armature from said power source in response to deenergization of both said actuators, and second switch means for connecting said power source to the second winding of said armature in response to the output signal indicative of the unloaded condition of said accessory device from said load sensor.

7. A driving mechanism for starting an internal combustion engine and driving an electrically driven accessory device such as a fluid pump under the control of an electric power applied thereto, comprising:
a starter motor assembly having an output shaft drivingly connected to said accessory device and arranged to be connected to said engine, said motor assembly being designed to generate a high output torque on said output shaft upon energization thereof;
an auxiliary motor assembly cooperable with said starter motor assembly to drive said accessory device and being designed to generate a low output torque in its energized condition and to act as a coupling between said starter motor assembly and said accessory device in its deenergized condition;
electrically operated actuator means for connecting said output shaft to said engine upon energization thereof and for disconnecting said output shaft from said engine upon deenergization thereof; and
an electric control apparatus for energizing said starter motor assembly and said actuator means to effect starting of said engine and for deenergizing them after starting of said engine, said control apparatus being further arranged to energize said auxiliary motor assembly when said accessory device is in its unloaded condition and to energize said starter motor assembly and deenergize said auxiliary motor assembly when said accessory device is in its loaded condition.

8. A driving mechanism as claimed in claim 7, wherein said electric control apparatus is arranged to energize said auxiliary motor assembly when said accessory device is applied with a load lower than a predetermined value and to energize said starter motor assembly and deenergize said auxiliary motor assembly when said accessory device is applied with a load higher than said predetermined value.

9. A driving mechanism for starting an internal combustion engine and driving an electrically driven accessory device such as a hydraulic pump, a pneumatic pump or the like under the control of an electric power applied thereto, comprising:

a starter motor assembly having an output shaft drivingly connected to said accessory device and arranged to be connected to said engine, said motor assembly being designed to provide a first operation mode for generating a high output torque on said output shaft and a second operation mode for generating a low output torque on said output shaft;

electrically operated actuator means for connecting said output shaft to said engine only when said motor assembly is operated in its first operation mode; and an electric control apparatus for activating said actuator means and activating said motor assembly to operate in its first operation mode so as to effect starting of said engine and for deactivating them after starting of said engine, said control apparatus being further arranged to activate said motor assembly to operate in its second operation mode when said accessory device is applied with a load lower than a predetermined value and to activate said motor assembly to operate in its first operation mode when said accessory device is applied with a load higher than said predetermined value.

* * * * *